May 23, 1933.  F. V. D. LONGACRE  1,909,974
VALVE MECHANISM
Filed Aug. 12, 1930
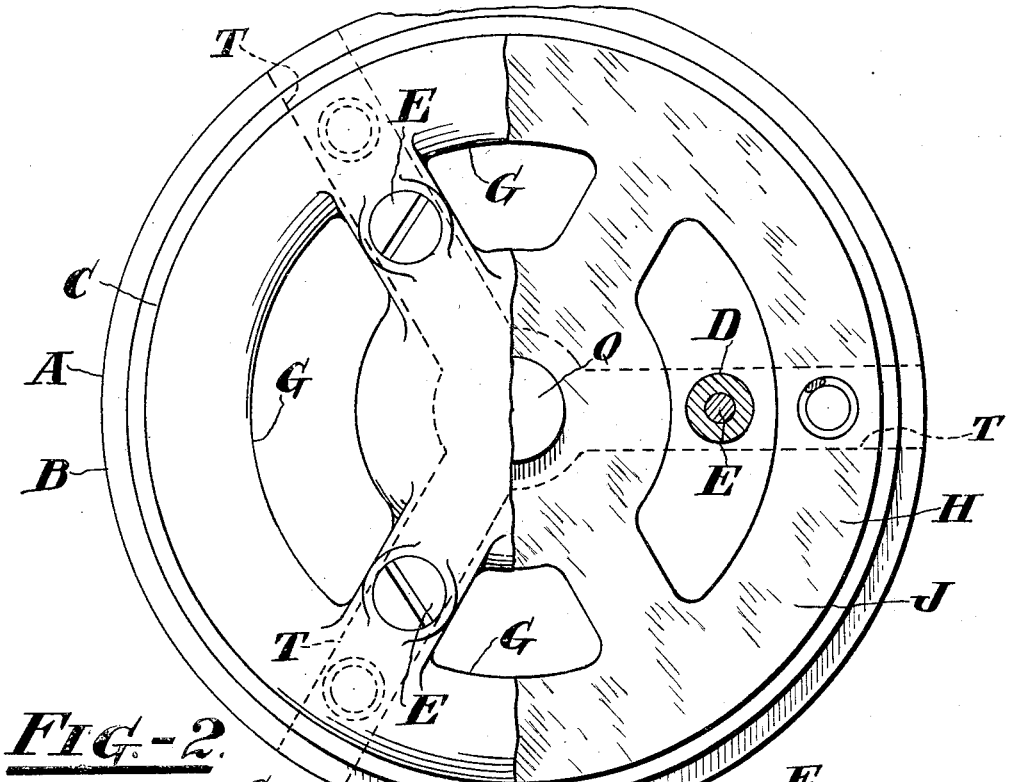
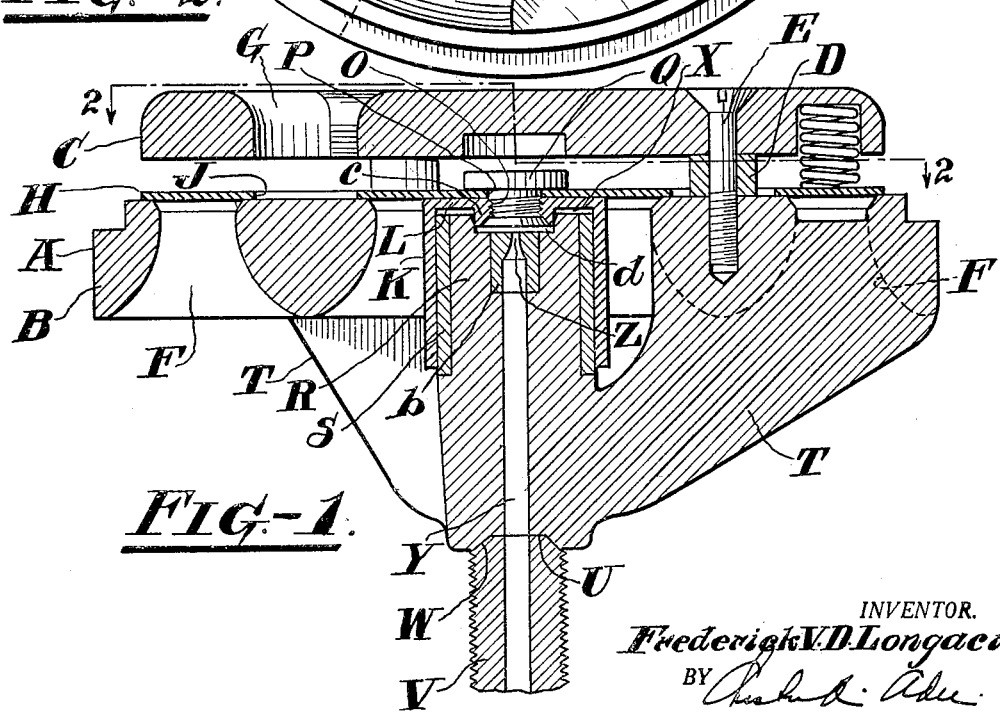
INVENTOR.
Frederick V. D. Longacre
BY
HIS ATTORNEY.

Patented May 23, 1933

1,909,974

UNITED STATES PATENT OFFICE

FREDERICK V. D. LONGACRE, OF YONKERS, NEW YORK, ASSIGNOR TO INGERSOLL-RAND COMPANY, OF JERSEY CITY, NEW JERSEY, A CORPORATION OF NEW JERSEY

VALVE MECHANISM

Application filed August 12, 1930. Serial No. 474,820.

This invention relates to valves, but more particularly to multi-ported plate valves adapted for use on compressors, pumps and the like to control the admission of fluid into or the discharge of fluid from the machine, depending upon whether the valve mechanism is being used as an inlet or a discharge valve.

One object of the invention is to assure simultaneous seating of all portions of the valve plate. This is accomplished by suitably guiding the valve plate so that all portions thereof will be equi-distant from the elements which serve as seats or stops for the valve plate throughout its entire range of movement.

Another object is to prevent the valve plate from impacting with severe force against the valve seat.

Other objects will be in part obvious and in part pointed out hereinafter.

In the accompanying drawing illustrating the invention and in which similar reference characters refer to similar parts, Figure 1 is a sectional elevation of a valve mechanism constructed in accordance with the practice of the invention, and Figure 2 is a plan view partly broken away and taken through Figure 1 on the line 2—2 looking in the direction indicated by the arrows.

Referring more particularly to the drawing, A designates generally a valve mechanism of the plate type comprising a valve seat B and a stop plate C which is held in spaced relation with respect to the valve seat B by spacers D interposed between these elements. The stop plate C may be conviently secured to the valve seat B by means of bolts or screws E which may also extend through the spacers D to maintain said spacers in assembled position.

The valve seat B and the stop plate C are provided with the usual ports F and G respectively for the passage of fluid through the valve mechanism. The flow of such fluid into or from the machine to which the valve mechanism A may be applied is controlled by a plate valve H reciprocable in the space between the stop plate C and the valve seat B.

The valve plate is preferably, as shown, in the form of a thin metallic disk having ports J therein for the passage of fluid from the ports F to the ports G or vice versa. The stop plate C however, is of such diameter that fluid may also flow around its periphery as well as through the ports G, so that when the valve mechanism is in the form of an inlet valve, such as that indicated in the drawing, fluid under pressure or atmospheric air issuing from the ports F will flow both through the ports G and around the periphery of the stop plate C.

In accordance with the present invention, means are provided to at all times maintain the valve plate H in parallelism with the ends of the valve seat B and the stop plate C which serve as seats for the valve plate H. To this end the valve plate is provided with a cup member K having an integral end wall L which seats against the side of the valve plate H.

In the wall L is a threaded aperture O which registers with an aperture P in the valve plate. The apertures are adapted to receive a bolt or threaded plug Q which extends through the aperture P and is threaded into the aperture O. Preferably the free end of the bolt Q is riveted over after the bolt Q is tightly threaded into position to assure against accidental unthreading of the bolt.

Extending into the cup K is a plug R which is shown as being an integral portion of the valve seat B and is preferably provided with an encircling wearing sleeve or bushing S whereon the cup K is adapted to slide.

The plug R which is located centrally of the valve seat B is preferably of considerably greater length than the valve seat to which it is connected by means of a plurality of ribs T, three being shown in this instance, which form a crab or spider for the valve seat and against which pressure may be applied for securing the valve mechanism in a machine. The end of the crab may accordingly be provided with a recess U to receive the end of a set screw V which may be threaded into a casing part of the machine. Preferably a portion of the wall of the recess U and the end of the set screw V are tapered in corresponding degree, as at W, to form a fluid tight joint between these elements at this point.

In addition to its function of forming a guide for the valve plate H the cup K also serves as a means for preventing severe impact of the valve plate H against the valve seat B. To this end the interior of the cup K is utilized as a cushioning chamber X into which cushioning fluid may be admitted and also exhausted therefrom through a passage Y formed in this instance in the set screw V and in the plug R.

The passage Y may convey either atmospheric air into the cushioning chamber X or pressure fluid in which latter case of course the admission of such pressure fluid may be controlled by a suitable device (not shown) but which may operate in synchronized movement with the valve plate H or with the piston of the machine to which the valve mechanism may be applied in a manner well understood in the art.

In order to assure an immediate and abundant supply of cushioning fluid in the cushioning chamber X at the instant of unseating of the valve plate H and thereby avoid the drawing of a vacuum in the cushioning chamber X during the opening movement of the valve plate, and at the same time assure a retarded exhaust of such fluid upon the return movement of the valve plate, the outlet opening or port, such as that designated by Z, of the passage Y is preferably in the form of a nozzle which decreases gradually in the direction of the cushioning chamber X and which nozzle, for convenience of construction, may be formed in a separate plug $b$ seated in the end of the plug R.

During the return movement of the valve plate H however, and during which time at least a portion of the cushioning fluid will be expelled from the cushioning chamber X, such cushioning fluid will flow from the said chamber at greatly decreased velocity. As a result, the cushioning fluid in the chamber X will be considerably compressed therein so that the valve plate H will seat only lightly against the valve seat B.

Preferably, however, means are provided to altogether cut off communication between the cushioning chamber X and the passage Y as the valve plate H approaches the valve seat B. To this end the cup K is provided with an inner longitudinally extending flange $c$ adapted to extend into a recess $d$ in the inner end of the plug R and into which recess the port Z of the passage Y opens. The recess $d$ in effect serves as an additional cushioning chamber, although to a lesser extent than does the chamber X by reason of the fact that the recess $d$ is at all times in communication with the passage Y. Owing to the restricted port Z however, the flow of cushioning fluid from the recess $d$ is somewhat retarded so that a substantial additional cushioning effect is obtained to assist that in the chamber X in cushioning the closing movement of the valve plate H.

As will be readily apparent, during a portion of the closing stroke of the valve plate H, the cushioning chamber X will be in communication with the passage Y so that said valve plate may travel at substantially the same speed at which it otherwise would in the absence of cushioning means. A slight resistance to its movement is offered by the cushioning fluid in the chamber X due to the restricted outlet opening of the passage Y.

As the valve plate H approaches the valve seat B, however, the flange $c$ enters the recess $d$ thus preventing further escape of fluid from the chamber X. The fluid remaining within the chamber will then be compressed throughout the remaining portion of the stroke of the valve plate H and will cushion the final portion of the closing stroke of the valve plate so that the said valve plate will return lightly to the seat B.

By compressing the fluid within the cushioning chamber X to a value greater than its initial value such cushioning fluid will, at the instant of unseating of the valve plate H, expand and thus assist in accelerating the subsequent opening movement of the valve plate.

The present invention has been found to be unusually efficient in practice since it enables the valve plate H to be operated at high lifts heretofore considered impractical and which when used in connection with known valve structures usually resulted in speedy destruction or failure of the valve plate. As will be readily apparent, by guiding the valve plate H in the manner described all portions of the said valve plate H will at all times be equi-distant from the elements which act as stops therefor. This is highly desirable since it avoids the objectionable condition of localized wear on portions of the valve plate and the valve seat and also entirely eliminates the objectionable slam or noise usually caused by the uneven seating of the valve plate against the seat.

Another highly desirable advantage of this invention is that a valve guided in the manner described is particularly adapted for use in inclined positions and in which positions the noise resulting upon the seating of the valve is usually considerably more pronounced than when the valve mechanism occupies vertical or horizontal positions. The movement of the valve plate H is at all times suitably cushioned, although in varying degrees throughout its stroke. This is desirable since when operating at high speeds a considerable portion of the stroke of the valve should take place against only slight resistance.

I claim:

1. A multi-ported valve for compressors and the like, comprising a pair of stop members, a valve plate reciprocable between the stop members, cooperative means associated with the valve plate and one stop member for guiding the valve plate and to form a cushioning chamber, there being a passage in said stop member through which cushioning fluid other than that flowing through the valve passes into and out of the chamber, and means for entrapping cushioning fluid in a portion of the chamber as the valve plate approaches one of its limiting positions.

2. A multi-ported valve for compressors and the like, comprising a stop plate, a valve seat, a valve plate reciprocable between the stop plate and the valve seat, a crab forming an integral portion of the valve seat, a cup, means for securing the cup to the valve plate, a plug on the valve seat extending into the cup to guide the valve plate and cooperating with the cup to form a cushioning chamber therein, there being a passage in the plug for admitting and exhausting cushioning fluid to and from the cushioning chamber, and means on the cup for cutting off communication between the passage and the cushioning chamber as the valve plate approaches the valve seat, thereby entrapping fluid in the chamber to prevent severe impact of the valve plate against the valve seat.

3. A multi-ported valve for compressors and the like, comprising a stop plate, a valve seat, a valve plate reciprocable between the stop plate and the valve seat, a cup, means for securing the cup fixedly to the valve plate, a plug on the valve seat extending into the cup to guide the valve plate and cooperating with the cup to form a cushioning chamber therein, a passage in the plug through which cushioning fluid other than that flowing through the valve passes into the chamber and is exhausted from the chamber, and means movable with the valve plate and adapted to cut off communication between the chamber and the passage as the valve approaches the valve seat, thereby entrapping fluid in a portion of the chamber to prevent heavy impact of the valve plate against the valve seat.

4. A multi-ported valve for compressors and the like, comprising a stop plate, a valve seat, a valve plate reciprocable between the stop plate and the valve seat, a cup, means for securing the cup fixedly to the valve plate, a plug on the valve seat extending into the cup to guide the valve plate and having a recess in communication with the interior of the cup, a supply and exhaust passage in the plug opening into the recess, and a hub on the cup slidable into the recess as the valve plate approaches the valve seat to cut off communication between the passage and the interior of the cup, thereby entrapping pressure fluid in the cup for cushioning the final seating movement of the valve plate.

In testimony whereof I have signed this specification.

FREDERICK V. D. LONGACRE.